United States Patent [19]
Follett

[11] 4,291,468
[45] Sep. 29, 1981

[54] MECHANICAL POINT LOCATOR

[75] Inventor: Earl C. Follett, Walnut Creek, Calif.

[73] Assignee: Measurematic Development Company, San Francisco, Calif.

[21] Appl. No.: 128,575

[22] Filed: Mar. 10, 1980

[51] Int. Cl.$^3$ .............................................. B25H 7/00
[52] U.S. Cl. .................... 33/192; 33/143 M; 33/486
[58] Field of Search ............ 33/192, 189, 191, 180 R, 33/143 M, 288, 150, 486, 487; 235/71 R, 71 A

[56] References Cited

U.S. PATENT DOCUMENTS

| | | | |
|---|---|---|---|
| 2,291,552 | 7/1942 | Lalonde | 33/192 X |
| 2,770,046 | 11/1956 | Wichmann | 33/192 X |
| 2,816,366 | 12/1957 | Barlow | 33/180 R |
| 2,998,659 | 9/1961 | Yaworsky | 33/192 X |
| 3,151,396 | 10/1964 | Junkins | 33/288 |
| 4,238,885 | 12/1980 | Lendi et al. | 33/143 M |

*Primary Examiner*—William D. Martin, Jr.
*Attorney, Agent, or Firm*—Owen, Wickersham & Erickson

[57] ABSTRACT

A mechanical point locator and distance divider provides for quick and reliable division of a distance into an integral fraction of the distance, being useful for drafting, with maps or charts, in the construction industry and around the home. Leading and trailing indicators are slidably mounted on a base or housing, and a cord and pulleys appropriately interconnect them to cause the trailing indicator to move at a speed and for a distance which are an integral fraction of the speed and distance the leading indicator is moved by the operator. Provision is made for assuring the return of the trailing indicator according to the same desired relationship with respect to the return of the leading indicator. Half-point and third-point locators are specifically described, but the principles of the invention enable the provision of any fractional point locator wherein the distance desired to be located is an integral fraction of a distance to which the device is applied.

18 Claims, 10 Drawing Figures

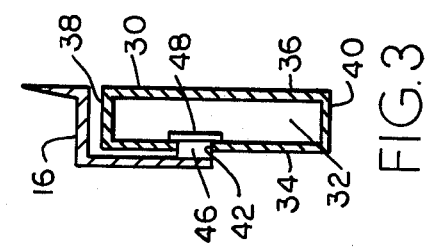
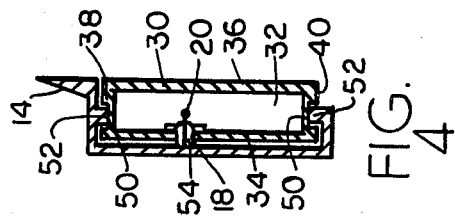
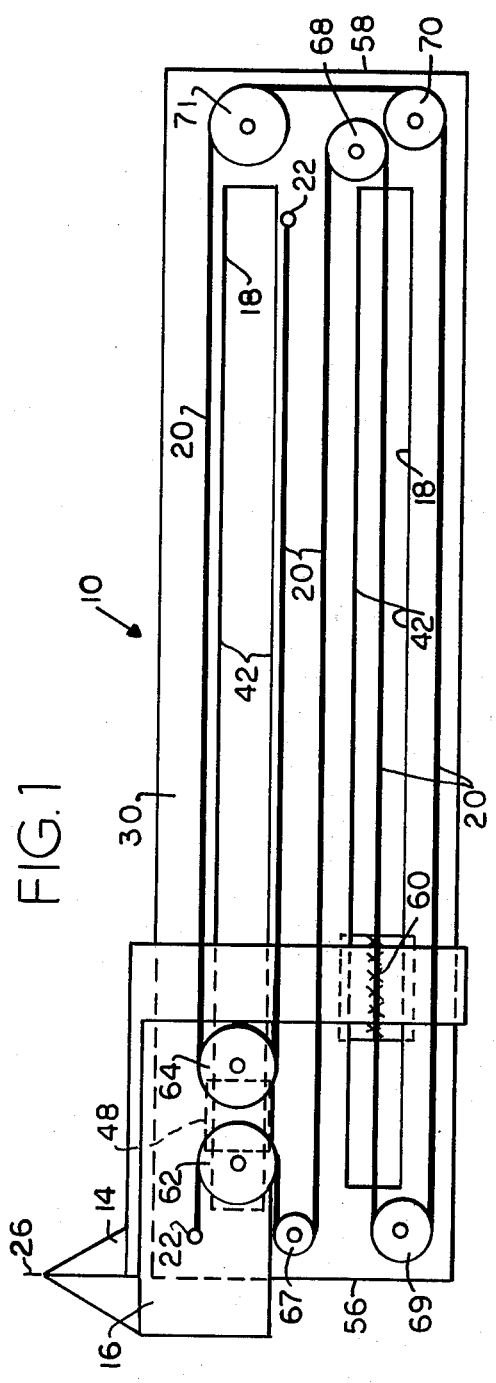
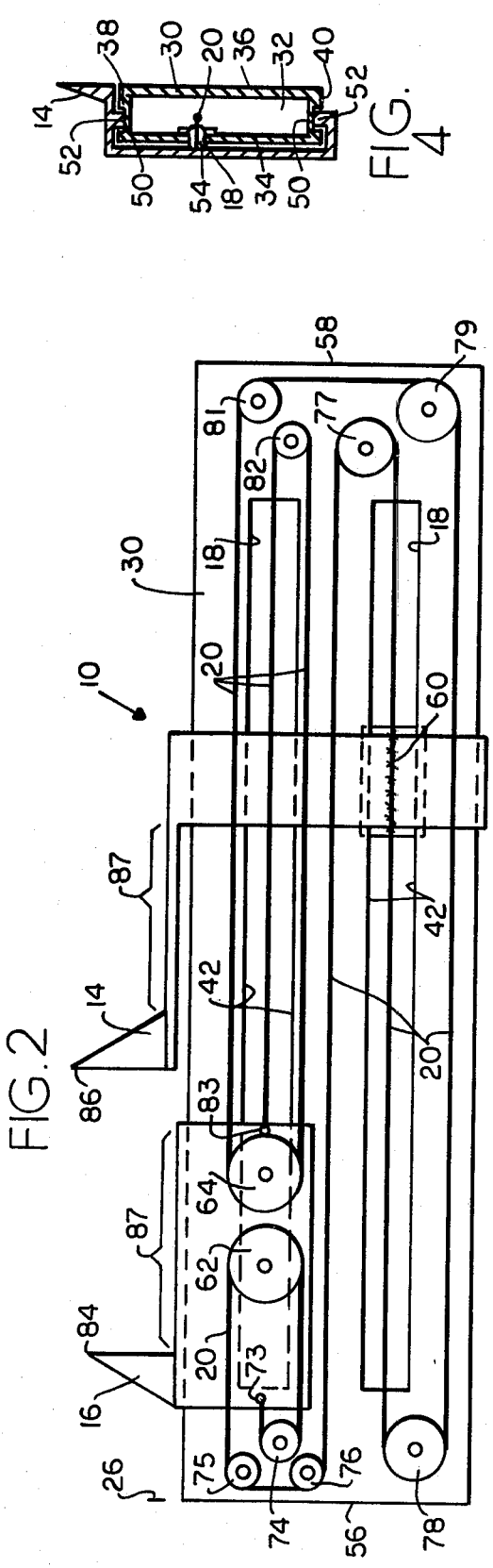

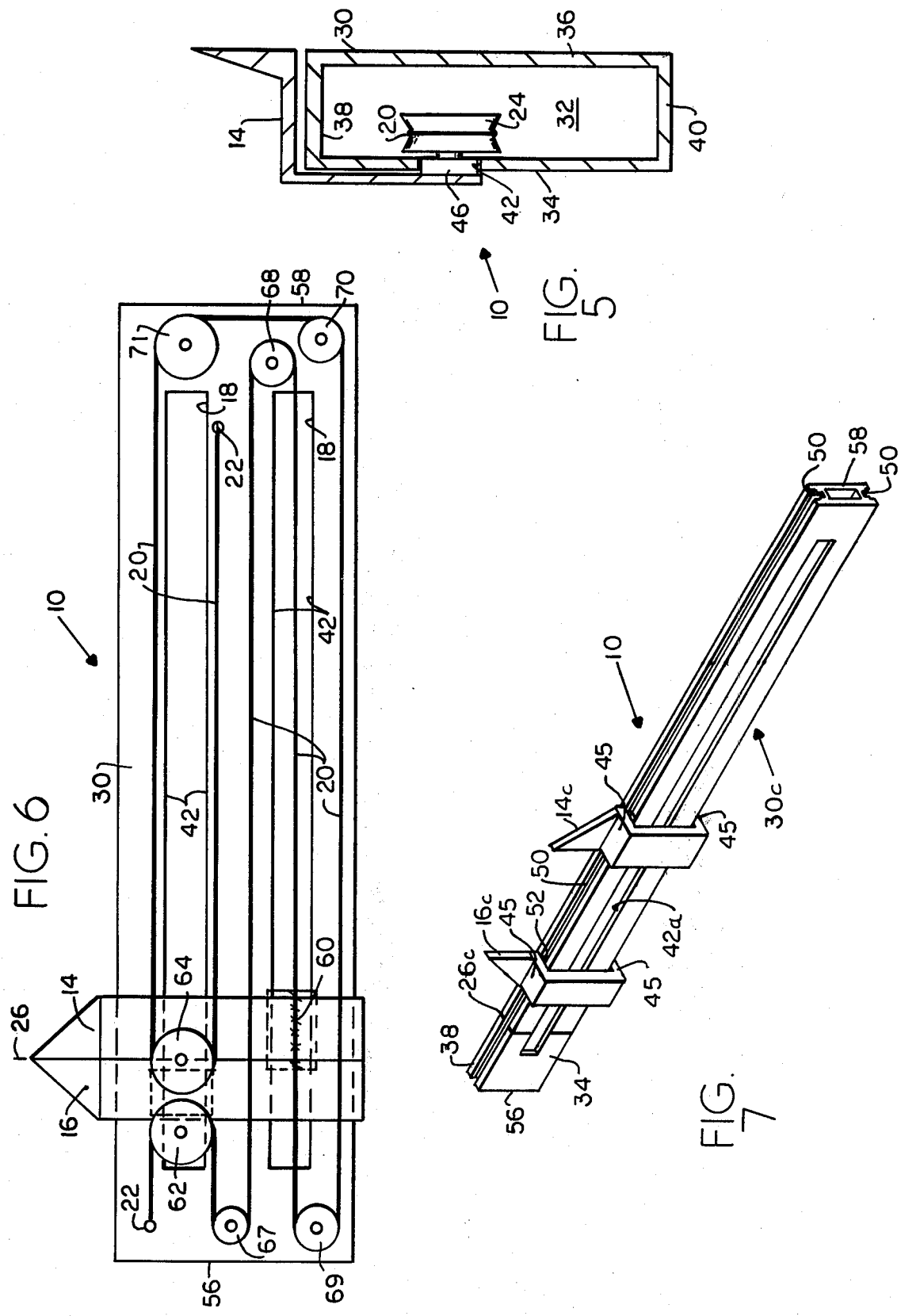

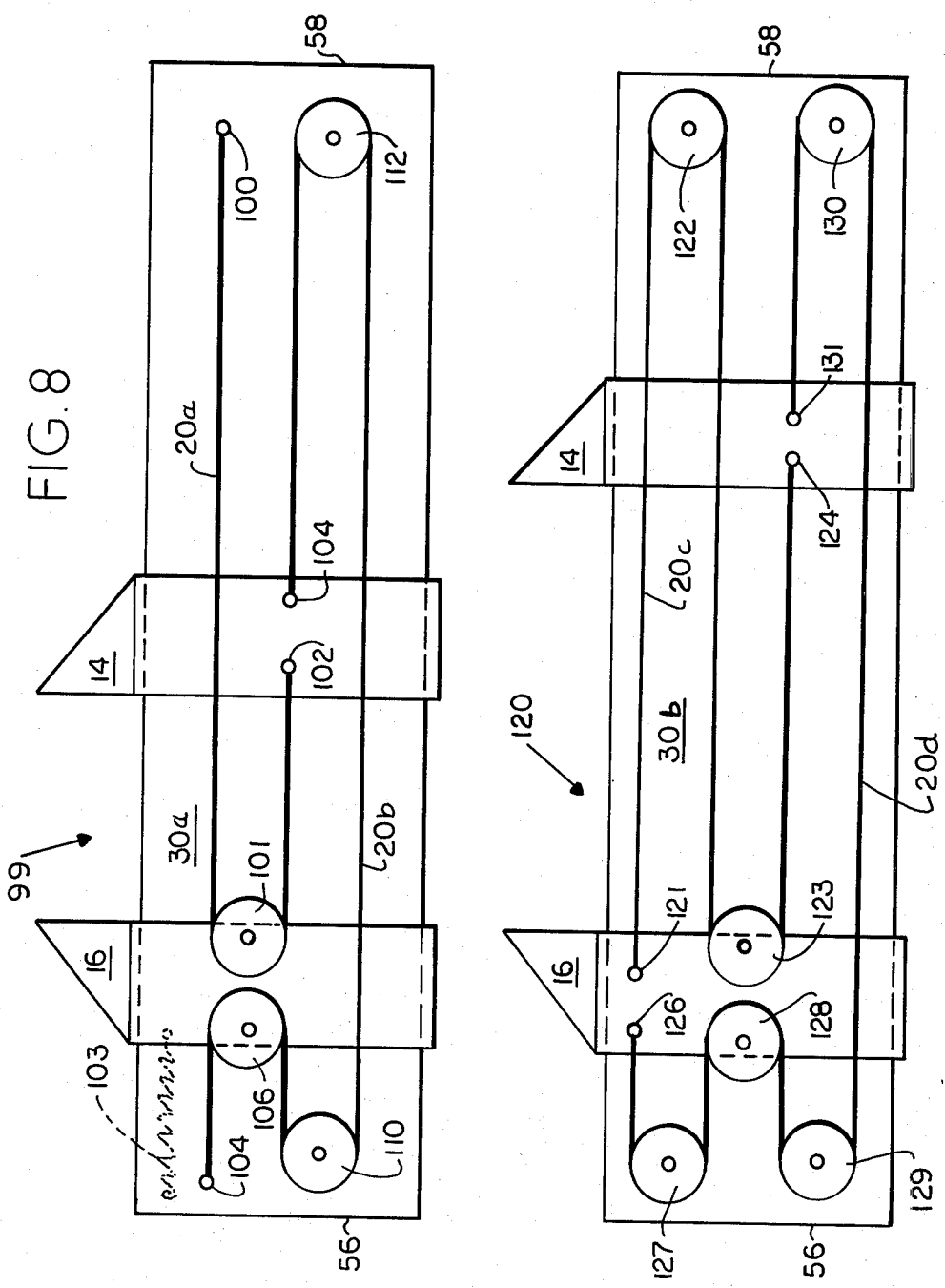

MECHANICAL POINT LOCATOR

BACKGROUND OF THE INVENTION

The invention relates generally to measuring devices, and more particularly a highly accurate device for mechanically locating a point which is at a desired fraction of the distance between two other points. It has many applications, such as in the construction industry, the drafting art, and around the home. Only two of several possible embodiments are needed to provide for a useful range of desired fractions.

Heretofore, when attempting to accurately measure half or one-third of the distance between two points it has been necessary first to measure the distance between the points, second to calculate the length of the desired fraction, and third to measure and mark that distance. Sometimes a caliper or micrometer has been used in conjunction with such measurements and calculators. In addition to being time consuming, a certain degree of error usually is inherent in such manual operations.

Another method of measuring desired fractions has been to traverse the distance with, for example, a rope, then fold the rope into halves or thirds, lay it along the original line and mark the desired point where the end of the fold falls. The inherent inaccuracy and time consumption of such a process is obvious.

The prior art does not provide an easily used, highly accurate device for locating the midpoint or one-third point of a desired distance. Devices such as rulers, calipers, micrometers, and measuring lines require a manual interaction, some calculation and probable inaccuracy. Remotely related solutions are found in the drapery art and in the hyperbolic position locator art.

Certain devices, as illustrated by U.S. Patents to Goudsmit, U.S. Pat. No. 2,562,664, and Johnson et al., U.S. Pat. No. 2,591,074, employ strings and pulleys to determine location as a function of the time it takes a radio signal to travel from a transmitting vessel to several receiving stations. The indicators are attached to moveable arms in a common plane, representing the receiving station, and are designed to vary distance in a hyperbolic function so that the intersection of the plotted lines indicates the position of the transmitter.

A more closely related technology is shown in Yaworsky and Morantz (U.S. Pat. Nos. 2,998,659 and 3,541,692) which teach the design of pleater gauges. These are used to determine where to put the pleats in a drapery composed of a number of pieces of material to be sewn together. The devices entail a series of indicator elements attached to each other and to a lead element by a series of lines. In Yaworsky different sized pulleys are used to provide for simultaneous differential expansion. By setting the complex mechanism of the gauge for the total width to be covered and for the number of pieces of materials being combined, the markers would be drawn out symetrically across the material showing where the pleats are to be located. Such devices are far more complex and serve a different function than the device of the present invention. Moreover, none of them teaches the novel arrangement of indicators and cord paths of the invention.

None of the prior art teaches a simple, compact and easy-to-use device for mechanically determining halves, thirds, and related fractions with a high degree of accuracy.

It is therefore an object of the invention to provide a device for readily indicating the location of a desired fraction of a total distance with a high degree of accuracy.

Another aspect of the invention provides a point locator device having a leading and a trailing indicator connected by a single line which passes over a number of pulleys so that the trailing indicator will be accurately drawn a desired fraction of the distance which the leading indicator is drawn, in the same direction.

A further aspect of the invention is the provision of a device which may be used with a high degree of accuracy and which retains that accuracy despite continued use, being resistant to forces applied to the indicators which would tend to alter this mechanical relationship between the indicators.

SUMMARY OF THE INVENTION

The invention teaches a mechanical point locator and distance divider for locating a second distance which is a fixed integral fraction of a first distance. The device has a base having a starting and a finishing end. There are two indicators, a leading indicator and a trailing indicator. Both indicators are slidably mounted for movement along the length of the base. The leading indicator is disposed closer to the finishing end than the trailing indicator. The trailing indicator is provided with pulley means, and pulley means are also provided on the base, at its starting end and at its finishing end. Cord means is provided for moving the trailing indicator a fixed integral fraction of the distance moved by the leading indicator, in the same direction of movement as the leading indicator. The cord means is fixed to the leading indicator and passes around the trailing indicator pulley means, and is associated with the trailing indicator and the finishing end of the base in a manner such that it forms an integral number of generally parallel runs, the integral number being the reciprocal of the integral fraction of movement. Return means is provided for returning the trailing indicator toward the starting end, with the movement relationship maintained, as the leading indicator is moved back toward the starting end. The return means can be a spring or a second cord means which passes from a trailing indicator pulley about pulley means at the ends of the base to the leading indicator. The second cord means is arranged to form the same integral number of generally parallel runs between the starting end and the trailing indicator. The invention includes embodiment wherein the integral fraction is one-half and one-third, and also smaller fraction.

DESCRIPTION OF THE DRAWINGS

The invention will now be described with reference to the drawings of which:

FIG. 1 is a frontal schematic view of a halves-locating embodiment of the invention, with the indicators at the zero position;

FIG. 2 is a frontal schematic view of a thirds locating embodiment of the invention, with the indicators in a measuring position;

FIG. 3 is a sectional view of the device of FIG. 1 or 2, showing one manner in which the indicator may be slidably attached to the housing;

FIG. 4 is another sectional view, showing another manner of slidable attachment of the indicator to the housing;

FIG. 5 is another view in cross-section, showing a further arrangement for slidable mounting of the indicator to the housing;

FIG. 6 is a frontal view of another embodiment of the halves locator in which the zero point is not at an edge of the device;

FIG. 7 is a perspective exterior view of a point locating device according to the invention;

FIG. 8 is a frontal view of a halves-locating embodiment, showing an alternate and simplified cord arrangement;

FIG. 9 is a frontal view of a thirds-locating embodiment, showing an alternate cord arrangement; and FIG. 10 is a view in cross-section, showing a trailing indicator with pulleys attached.

DESCRIPTION OF THE PREFERRED EMBODIMENTS

As shown in FIGS. 1, 2, 5 and 6, the mechanical point locator 10 is a device which may resemble an elongated rectangular box. Extending from the device are a pair of indicators or markers 14 and 16 which are slidably mounted on the device to enable them to be drawn along its length. The indicators are of two types, a leading indicator 14 to be drawn across the distance to be measured and a trailing indicator 16 to be conveyed across a distance which is a desired fraction of the distance being measured.

The indicators 14 and 16 are each connected through slot-like openings in one of the side walls of the device to a common cord or line 20 which is located inside the device. The openings 18 and the internal components are indicated schematically in FIGS. 1 and 2, as well as in FIGS. 6, 8 and 9, with the openings 18 and the internal components superimposed for clarity. The cord 20, in addition to being attached to the indicator, has two fixed end points within the device and passes over a series of turning points or pulley means which may comprise pulleys as shown or merely non-rotatable, low-friction direction reversing elements. As used herein, the terms "pulley" and "pulley means" can be taken to mean an actual pulley or a post or pin direction reversing element. The path of the cord 20 over the pulleys, and its attachment to the indicators 14 and 16, is done in a manner so that the motion of the leading indicator 14 along the length of the device will result in a simultaneous corresponding movement by the trailing indicator 16 in the same direction, but at a desired fraction of the speed and distance of the leading indicator 14.

Therefore, when the leading indicator 14 is at the zero point 26, the trailing indicator 16 will also be there, as shown in FIGS. 1 and 6. When the leading indicator 14 is moved twelve inches from the zero point 26, the trailing indicator 16 will have moved six inches in the half-point locator embodiments of FIGS. 1, 6 and 7, whereas with the thirds-locating embodiment the trailing indicator would have moved only four inches, as shown in FIG. 2. Multiple uses of the half-locator would sequentially indicate ½, ¼, 1/16, 1/32, etc. of the original distance. Likewise, multiple uses of the thirds-locator would sequentially indicate ⅓, 1/9, 1/27, etc. of the original distance. Combined use of the two embodiments would indicate 1/6, 1/12, 1/18, 1/24, etc. A wide range of fractions is therefore obtainable through multiple uses of a half and a thirds locator. However, it is also within the scope of the invention to provide a single point locator capable of dividing a distance into any integral fraction, i.e., 1/n, where n is an integer, simply by providing additional pulley means and runs of cord beyond what is shown and described herein for half-point and third-point locators.

Reference to FIGS. 3, 4 and 5 shows that the mechanical point locator 10 preferably includes a housing 30 acting as a base and encasing the cord 20 and turning points 24. The back of the device is preferably flat with no protruding parts so that it may be set against the object to be divided, leaving the indicators freely movable. The hollow interior 32 of the housing, as surrounded by a front wall 34, back wall 36, top wall 38, and bottom wall 40 provides a sheltered space for the cord 20 and pulleys or turning points 24, preventing dirt and other objects from entering the device and jamming or otherwise interfering with operation of the device. Tracks 42 in the front wall 34 mount and guide the slidable indicators with little friction, preferably as shown.

It should be understood that the point locating devices of the invention do not depend for their operation on the housing 30, it being sufficient that some form of base is provided as a mounting for the cord 20, the pulleys or pulley means, and the indicators. Thus, a flat plate similar to the illustrated front wall 34, with appropriate indicator tracks and cord and pulley mountings could act as a base, with the indicators 14 and 16 extending straight up from their point of attachment at the track 42, as shown in dashed lines in FIG. 5. It is preferable that the mechanical workings of the device be fully housed as illustrated, to provide a smooth, flat surface for placement against the object being measured and to prevent any interferences with operation. Thus, although various modifications of the indicator, cord and pulley mounting arrangement shown in the drawings are considered to be within the scope of the invention so long as they employ the novel indicator and cord path relationships of the invention, they may be less desirable than the housing enclosed device.

Several arrangements are possible for slidably attaching the indicators 14 and 16 to the device. FIG. 3 illustrates one manner of attachment in which the indicator 14 or 16 is extended over the top wall 38 so that it lies flush with the back wall 36 against which the object would be placed. The indicator extends through the track 42 via bar means 46 which securely fits into the track 42. The bar means 46 may be a block of the material of which the device is made. Securing means 48, wider than the track, is attached to the internal side of the bar means 46 holding the indicator securely in place within the track 42. In one embodiment, shown in FIG. 5, the securing means 34 is a pair of pulleys 24, only one being shown, having diameters wider than the track 42. These pulleys 24 are rotatably attached to the inner side of the bar means 46, and in addition to holding the indicator from being pulled out of the track 42, form part of the mechanism for simultaneously moving the indicators in the desired ratio.

FIG. 4 shows a preferable manner of attachment of the indicators, employing tracks 50 indented into the top wall 38 and bottom wall 40 into which reciprocal tabs 52 securely fit for slidable attachment of the indicators. Connection through the front wall 34 to the cord 20 may be achieved by a post 54 or other suitable connection extending through a slot 18 and connected directly to the cord 20 for the leading indicator 14, or around posts extending from the trailing indicator 16 and supporting a pair of pulleys (not shown).

Regarding the materials of construction, the device itself may be made of wood, metal, plexiglass or other plastic, or other suitable material. Preferably a strong, durable plastic is employed. The cord or line 20 should be highly resistant to stretching forces to retain secure attachment within the device and to assure accuracy and avoidance of error. The pulleys 24 may be of any suitable material, rotatably mounted inside the device to eliminate wear on the cord from the path direction changes incurred during measuring. Of course, the device will function if low-friction posts are used to effect such direction change, but the illustrated pulleys are preferred because they assure smooth operation.

FIG. 6 shows an embodiment of a half-point locator wherein the indicators are slidably attached in the manner shown in FIG. 4, but wherein the zero point 26 is not at the end of the device. With the zero point 26 marked, etched or otherwise located on the housing 30, the indicators coincide therewith when in the zero position as shown in FIG. 6, and the zero point is always available as a reference during point locating. This point, rather than the end of the housing or base 30, is thus used to place alongside the measurement point on the object to which the point locating device is applied. Otherwise, this device is similar to that of FIG. 1.

A device with three indicators which simultaneously indicates halves and thirds is also possible by superimposing one cord path over the other in a single device, overlapping the trailing indicators so they both begin at the zero point, and having both cords attached to a single leading indicator 14 (not illustrated).

FIG. 7 shows in perspective a mechanical point locator 10 of the invention, as it preferably appears at the exterior. The embodiment of FIG. 7 employs a zero point 26c which is marked on the top wall 38 and the front wall 34 of the housing or base 30c, positioned inwardly from the left end 56 (as viewed in the figure) of the housing. A preferred single slot 42a for both indicators is shown, with a structural arrangement similar to that discussed above in reference to FIG. 4 for slidable retention of the indicators on the housing. As seen in FIGS. 7 and 4, an upper grooved track 50 is formed in the housing 30c, and a similar grooved track is on the bottom edge of the housing. The leading and trailing indicators 14c and 16c (FIG. 7) are generally U-shaped with track guides 52 (FIG. 4) extending from transverse flanges 45 of the U-shaped indicators into the tracks.

A very important feature of the invention is the arrangement of cord paths and pulley means shown in the drawings, which is effective to cause simultaneous movement of two indicators (or even three, as discussed above), in the same direction at different speeds and distances. By this arrangement, movement of the leading indicator causes the trailing indicator accurately to travel a fixed integral fraction of the distance travelled by the lead indicator.

The basics of the cord-pulley-indicator relationship for a half-point locator 99 are shown in the somewhat schematic view of FIG. 8. The two indicators 14 and 16 are slidably mounted to the base plate or housing 30a in a suitable manner, which may be as described above. In the device as illustrated, the beginning or starting end 56 of the base does not coincide with the zero point 26, the latter being spaced inwardly as shown. Near a finishing end 58 of the device a cord 20a is fixedly attached to the base at a point 100. This cord 20a passes over a pulley or pulley means 101 on the trailing indicator 16, changing direction, thence to a point 102 of fixed attachment to the leading indicator 14, forming two parallel runs of cord 20a. Thus, by arrangement described so far, movement of the leading indicator 14 to the right in the drawing will cause the trailing indicator 16 to move in the same direction at half the speed and distance. However, restraint is needed for preventing overtravel of the trailing indicator 16 and to return the trailing indicator back toward the starting end 56 when the leading indicator is so returned, according to the same speed and distance relationship. A simple spring or other tensioning device 103, shown in dashed lines in FIG. 8 may be provided for this purpose, connected to the base 30a and to the trailing indicator. However, it is preferable that a further cord arrangement be provided, acting oppositely, in a sense, to the cord 20a by pulling the trailing indicator back toward the starting end as the leading indicator is moved in that direction, the cord 20a is fed back toward its original position by the pulling movement of the trailing indicator 16.

Therefore, a second cord 20b extends from a fixed attachment point 104 near the starting end of the base 30a over a pulley means 106 on the trailing indicator, reversing direction, forming two parallel runs of cord 20b similar to the two runs of cord 20a. Movement of the lower run of cord 20b (as viewed in FIG. 8) will move the trailing indicator at half the speed and for half the distance. This lower run of cord 20b, as it leaves the pulley means 106, moves at the same speed and in the same direction as the leading indicator 14. To correlate these two similar motions, the cord 20b passes over two direction-reversing pulleys or pulley means 110 and 112, to a point of attachment 114 to the leading indicator 14 as illustrated.

The cords 20a and 20b may comprise a single cord 20, secured to the leading indicator with the illustrated attachment points 102 and 114 coinciding, and this is preferred, since the points 102 and 114 should be at the same level on the indicator 14 in any event to avoid any tendency of the indicator to be tilted in the track. Also, this requires only one attachment and provides a more efficient assembly.

FIG. 9 is a schematic view similar to FIG. 8, but showing the mechanical arrangement and function of a thirds locator 120. In this form of locator a first cord or cord portion 20c is connected to the trailing indicator 16 at a point 121, then passes over a direction-reversing pulley or pulley means 122 secured to the base 30b near the finishing end 58, then returns to the trailing indicator and passes over a pulley means 123 mounted thereon, thence to a connection 124 to the leading indicator. Thus, three parallel runs of cord 20c are formed, and movement of the leading indicator 14 to the right as viewed in FIG. 9 moves the three runs at successively different speeds and causes the trailing indicator 16 to move at one-third the speed and distance of the leading indicator. The remaining cord 20d in FIG. 9 provides for restraint and return of the trailing indicator, as in the half-point locator described above. As in that embodiment, a return spring (not shown) could be provided in lieu of the cord portion 20d, but the cord is preferred. As illustrated, the cord portion 20d acts similarly to the cord 20b, except that it provides for three initial runs of cord, from an initial connection point 126 on the trailing indicator over a base-mounted pulley means 127, then over a pulley means 128 on the trailing indicator and back toward the left in the figure to form the three parallel runs movable at different speeds. Further base-mounted pulley means 129 and 130 bring the highest-speed motion of the cord 20d to the leading indicator in precisely the same manner as in FIG. 8, the cord 20d being affixed to the leading indicator at a point 131.

In both embodiments described above it is important that all runs of cord connected directly to an indicator or to a pulley means on an indicator be parallel to the path of movement of the indicators, so that cord takeup and payout is balanced and stress and slack in the cord(s) are avoided. Of course, cord runs merely extending between base-mounted pulleys may be oblique if desired, since this will not affect operation. This is true of the devices of FIGS. 1–7 as well as FIGS. 8 and 9.

FIG. 1 illustrates one cord-pulley-indicator arrangement and other features for the half-point locator 10. The leading indicator 14 has a single fixed point of attachment 60 to the cord 20. The trailing indicator 16 has two rotatable pulley or pin points of connection to the cord 20, a return pulley means 62 shown at the left, and a forward pulley means 64 shown at the right.

The cord 20 begins at a fixed end point 22 at the beginning end 56 of the base or housing 30, passes around the return pulley means 62 on the trailing indicator 16, around a pulley 67 mounted on the beginning end 56, across the device and around a pulley 68 at the indicator or finishing end 58, back across the device to the leading indicator attachment 60. From here, a different cord may be used if desired, but as discussed above, preferably the same cord 20 extends (left in the figure) to another base-mounted pulley 69 at the beginning end 56, near the bottom, from which it crosses the device to a further base-mounted pulley 70 which may be at the same level as the pulley 69, at the indicating end 58. From here, the cord 20 goes up to an upper base-mounted pulley 71 at the indicating end 58, around the forward pulley 64 on the trailing indicator 16 to a fixed end point 22 near the indicating or finishing end. This arrangement should be compared to FIG. 8, since it provides for similar function but with additional base-mounted pulleys so that the connection 60 of the cord to the leading indicator can be at a preferred location. When the leading indicator 14 is drawn toward the right or indicating end 58, the cord will be drawn around the forward pulley 64 on the trailing indicator 16 causing it to travel in the same direction as the leading indicator but at a mechanical advantage of 1:2, as in the simplified device illustrated in FIG. 8. When the leading indicator 14 is moved back toward the beginning end 56, the cord will be drawn around the pulleys 68 and 67, then around the return pulley 62 on the trailing indicator, causing it to return in the same direction as the leading indicator, eventually to the zero point 26.

FIG. 2 illustrates an embodiment of a thirds locator. For simplicity, each pulley is shown separately, on a separate axis, but in some cases it may be preferable to have certain pulleys mounted coaxially, though still with independent operation. Such an arrangement is indicated somewhat schematically in FIG. 10 for two coaxial pulleys 72, and the arrangement may be used in any of these described embodiments. The same is true, of course if low-friction posts are used as direction reversing elements.

The cord 20 in FIG. 2 begins at a fixed end point 73 on the trailing indicator 16, from which it passes around a base-mounted pulley 75 at the beginning end 56, back around another base-mounted pulley 75 at the beginning end 56 and down around a further base-mounted pulley 76 at the beginning end 56. The pulley 76 is optional, but it helps avoid interference of the cord 20 with the return pulley 62. The cord then passes to a base-mounted pulley 77 at the indicating end 58, reversing direction and extending back to the fixed leading indicator attachment point 60. From here, the cord 20 (or a separate cord as described above) extends to a base-mounted pulley 78 at the beginning end 56, across to a similar pulley 79 at the indicating end 58 and up to an upper base-mounted pulley 81, around the forward pulley 64 on the trailing indicator 16 and around another base-mounted pulley 82 at the indicating end 58 to a point of fixed attachment 83 on the trailing indicator 16. The cord attachment points 83 and 73 could advantageously be at the pulley means 64 and 62 if the pulley means are simple low-friction direction reversed posts (not illustrated).

The attachment 60 to the leading indicator 14 should be made such that both indicators 14 and 16 are at the zero point 26 at the same time. As FIGS. 1 and 2 show, the points of attachment to the cord 20 are to the right of the indicator points 84 and 86, and the indicators are offset so the cross-over area 87 of the leading indicator 14 is above the cross over area 87 of the trailing indicator. The cross-over area 87 is, of course, eliminated in the embodiment shown in FIG. 6, where the zero point 26 is located to the right of the beginning edge 56.

To those skilled in the art to which this invention relates, many changes in construction and widely differing embodiments and applications of the invention will suggest themselves without departing from the spirit and scope of the invention. The disclosure and the description herein are purely illustrative and are not intended to be in any sense limiting.

I claim:

1. A mechanical point locator and distance divider for locating a second distance which is a fixed integral fraction of a first distance, comprising:
   a base having a starting end and a finishing end;
   a leading indicator and a trailing indicator, both slidably mounted for movement along the length of the base, the leading indicator being toward the finishing end;
   trailing indicator pulley means secured to the trailing indicator;
   said starting end of the base having first pulley means secured thereto and said finishing end of the base having second pulley means;
   first cord means for moving the trailing indicator said fixed integral fraction of the distance moved by the leading indicator, in the same direction as the leading indicator as it is advanced toward the finishing end of the base, said first cord means being fixed to the leading indicator and then passing around the trailing indicator pulley means, and further being associated with the trailing indicator and the finishing end of the base such that the cord means forms an integral number of generally parallel runs, the integral number being the reciprocal of said integral fraction, whereby the trailing indicator moves at said integral fraction of the rate of the leading indicator; and
   return means for returning the trailing indicator toward the starting end at said integral fraction of the rate of the leading indicator as the leading indicator is moved toward the starting end.

2. The mechanical point locator of claim 1, wherein the return means comprises second cord means fixed to the leading indicator and passing around the second pulley means, then around the first pulley means and then the trailing indicator pulley means, and further being associated with the trailing indicator and the starting end of the base such that the second cord means forms said integral number of generally parallel runs of the second cord means between the starting end and the trailing indicator.

3. The mechanical point locator of claim 2, wherein said first and second cord means comprise a single cord fixed to the leading indicator and extending therefrom toward the trailing indicator pulley means in the trailing direction and toward the second pulley means in the leading direction.

4. The mechanical point locator of claim 2, wherein said base comprises a housing which encloses the cord means and pulley means, said housing having an access opening through which said indicators are connected to said cord means and said pulley means.

5. The mechanical point locator of claim 4, wherein said integral fraction is one-half;
said first pulley means comprising a middle level pulley and a lower level pulley, and said second pulley means comprising an upper level pulley, a middle level pulley and a lower level pulley, and said trailing indicator pulley means comprising two pulleys;
said first cord means attached to the leading indicator and passing sequentially around the starting end lower level pulley, the finishing end lower level pulley, the finishing end upper level pulley, a pulley on the trailing indicator, and attached to the housing at the finishing end;
said second cord means attached to the leading indicator and passing sequentially around the finishing end middle level pulley, the starting end middle level pulley, the other pulley on the trailing indicator, and attached to the housing at the starting end;
movement of the leading indicator toward the starting end causing the trailing indicator to move toward the starting end at one-half the rate of the leading indicator, until both indicators come together at a zero point on the starting end.

6. The mechanical point locator of claim 4, wherein said integral fraction is one-third;
both said first and second pulley means comprising a two coaxial upper level pulleys, a middle level pulley, and a lower level pulley, and said trailing indicator pulley means comprising two coaxial pulleys;
said first cord means attached to the leading indicator and passing sequentially around the starting end lower level pulley, the finishing end lower level pulley, one of the finishing end upper level pulleys, one of the trailing indicator pulleys, the other finishing end upper level pulley, and attached to the trailing indicator;
said second cord means attached to the leading indicator and passing sequentially around the finishing end middle level pulley, the starting end middle level pulley, one of the starting end upper level pulleys, the other trailing indicator pulley, the other starting end upper level pulley, and attached to the trailing indicator;
movement of the leading indicator toward the starting end causing the trailing indicator to move toward the starting end at one-third the rate of the leading indicator, until both indicators come together at a zero point on the starting end.

7. A mechanical thirds locator, comprising:
a base having a starting end and a finishing end;
a leading indicator and a trailing indicator, both being slidably mounted for movement along the length of the base, the leading indicator being toward the finishing end;
trailing indicator pulley means secured to the trailing indicator;
first pulley means secured at the starting end of the base and second pulley means secured at the finishing end of the base;
first cord means for moving the trailing indicator one-third the distance moved by the leading indicator in the same direction as the leading indicator is advanced toward the finishing end of the base, said first cord means being fixed to the leading indicator and to the trailing indicator and passing around the trailing indicator pulley means and the second pulley means and forming three generally parallel runs, thereby moving the trailing indicator at one-third the rate of the leading indicator; and
return means for moving the trailing indicator toward the starting end at one-third the rate of the leading indicator as the leading indicator is moved toward the starting end.

8. The mechanical thirds locator of claim 7, wherein the return means comprises second cord means fixed to the leading indicator, passing around the second pulley means, then around the first pulley means, the trailing indicator pulley means, again the first pulley means and then fixed to the trailing indicator, forming three generally parallel runs between the trailing indicator and the starting end of the base.

9. The mechanical thirds locator of claim 7, wherein the return means comprises a spring means connecting the starting end of the base and the trailing indicator.

10. The mechanical thirds locator of claim 7, wherein said base is a housing which encloses the cord means and pulley means, said housing having an access opening through which said indicators are connected to said cord means and pulley means.

11. The mechanical thirds locator of claim 7, wherein each said pulley means has separate guide means for each passage of a cord means around it.

12. The mechanical thirds locator of claim 11, wherein each said separate guide means comprises a pulley.

13. A mechanical halves locator, comprising:
a base having a starting end and a finishing end;
a leading indicator and a trailing indicator, both being slidably mounted for movement along the length of the base, the leading indicator being toward the finishing end;
trailing indicator pulley means secured to the trailing indicator;
first pulley means secured at the starting end of the base and second pulley means secured at the finishing end of the base;
first cord means for moving the trailing indicator one-half the distance moved by the leading indicator in the same direction as the leading indicator is advanced toward the finishing end of the base, said first cord means being fixed to the leading indicator and to the base at the finishing end and passing around the trailing indicator pulley means and forming two generally parallel runs, thereby moving the trailing indicator at one-half the rate of the leading indicator; and return means for moving the trailing indicator toward the starting end at one-half the rate of the leading indicator as the leading indicator is moved toward the starting end.

14. The mechanical halves locator of claim 13, wherein the return means comprises second cord means fixed to the leading indicator, passing around the second pulley means, then around the first pulley means, the trailing indicator pulley means, and then fixed to the base at the starting end, forming two generally parallel runs between the trailing indicator and the starting end of the base.

15. The mechanical halves locator of claim 13, wherein the return means comprises spring means connecting the starting end of the base and the trailing indicator.

16. The mechanical halves locator of claim 13, wherein said base is a housing which encloses the cord means and pulley means, said housing having an access opening along the length of said housing through which said indicators are connected to said cord means and said pulley means.

17. The mechanical halves locator of claim 13, wherein each said pulley means has separate guide means for each passage of a cord means around it.

18. The mechanical halves locator of claim 17, wherein each said separate guide means comprises a pulley.

* * * * *